United States Patent [19]

Fortin

[11] Patent Number: 4,711,499

[45] Date of Patent: Dec. 8, 1987

[54] TIPPER TRAILER

[76] Inventor: Jean-Louis Fortin, 9, rue Picard, 52410 Eurville-Bienville, France

[21] Appl. No.: 737,423

[22] Filed: May 24, 1985

[51] Int. Cl.$^4$ ............................................. B60P 1/04
[52] U.S. Cl. .................................... 298/5; 298/17 R; 298/20 R; 414/483
[58] Field of Search ................ 298/5, 15, 17 R, 17 B, 298/17 SG, 17 T, 20 R; 414/434, 435, 436, 439, 483, 485, 471

[56] References Cited

U.S. PATENT DOCUMENTS

| | | | |
|---|---|---|---|
| 3,066,983 | 12/1962 | Bay | 298/20 R X |
| 3,690,490 | 9/1972 | Hall | 414/485 X |
| 3,833,263 | 9/1974 | Jackson | 414/485 X |
| 3,977,726 | 8/1976 | Prestayko | 298/5 |

FOREIGN PATENT DOCUMENTS

| | | | |
|---|---|---|---|
| 2362323 | 6/1974 | Fed. Rep. of Germany | 414/471 |
| 267717 | 4/1927 | United Kingdom | 298/20 R |
| 690579 | 4/1953 | United Kingdom | 298/20 R |
| 2075928 | 11/1981 | United Kingdom | 414/469 |
| 272072 | 4/1971 | U.S.S.R. | 298/17 R |

Primary Examiner—Leslie J. Paperner
Assistant Examiner—Janice Krizek
Attorney, Agent, or Firm—Murray and Whisenhunt

[57] ABSTRACT

The trailer bed plate (3) is tipped by the towing vehicle moving backwards. The tow bar (1) is hinged to a sliding hinge (2) disposed on the underside of the bed plate, and connected via at least one connecting rod (4) to wheel-supporting frame (5) which is hinged to the rear of the bed plate at (11). When the sliding hinge is released to slide rearwardly, the rod-frame-bed triangle changes shape at the same time as the trailer tips. The trailer may then be locked in this position and tilted back about the wheels so that its bed plate occupies a higher horizontal plane than that occupied in the running position. The trailer then constitutes a table, or work bench.

8 Claims, 7 Drawing Figures

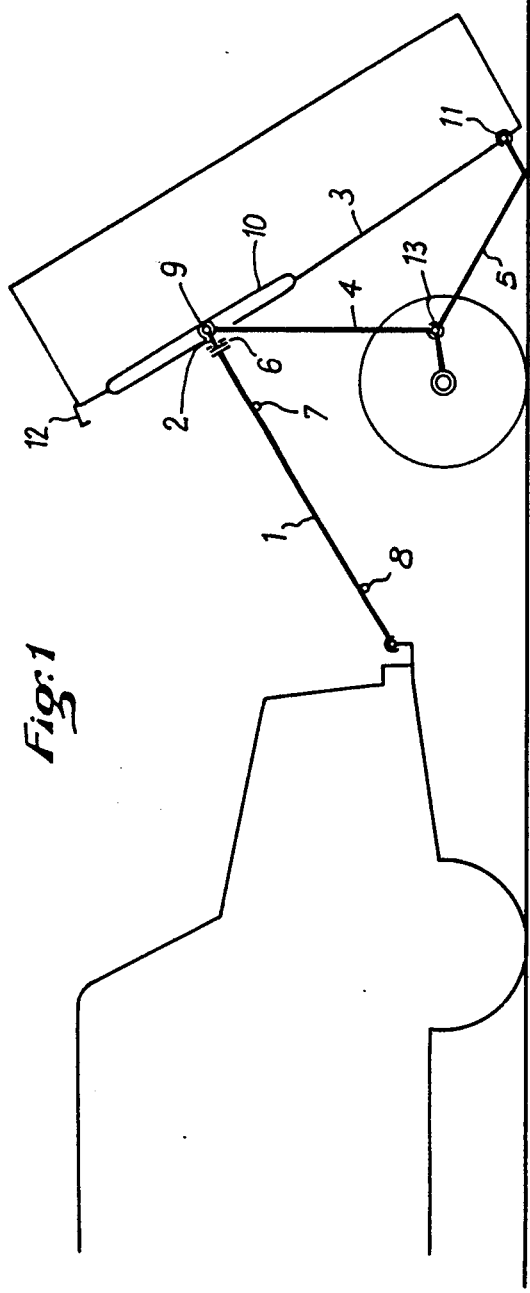
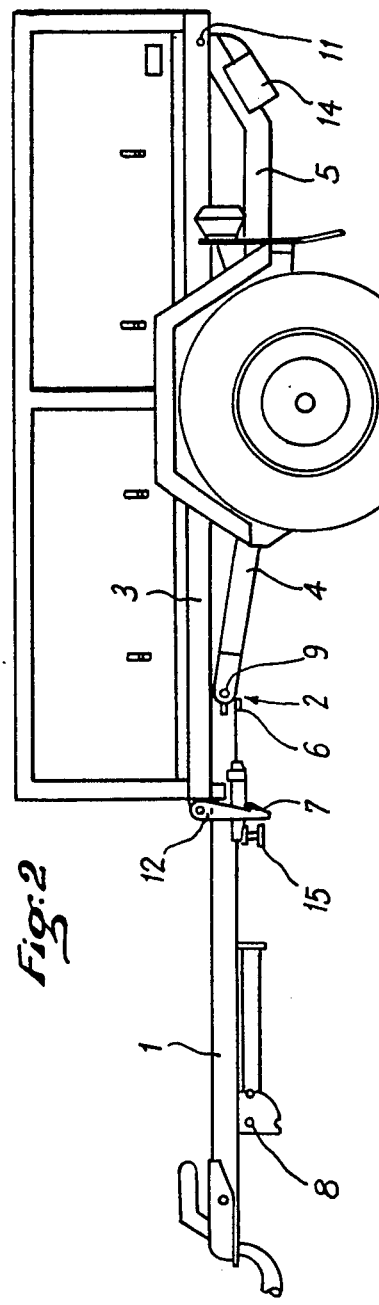

TIPPER TRAILER

The present invention relates to a tipper trailer capable of taking up several different positions under the effect of reverse thrust. These positions include a conventional position for emptying the trailer, and other positions in which the trailer may be used as a table, as a workbench, as scaffolding, etc, and in all cases the only driving force need to obtain such positions is reverse thrust from the towing vehicle.

BACKGROUND OF THE INVENTION

A present, nearly all tipper bodies make use of hydraulic means or winch means to obtain the tipping effect. Such means are excessively cumbersome and heavy for use with trailers intended for light or medium loads. The concept of tipping by means of the driving force of the towing vehicle operating in reverse is not, of itself, novel.

For example, British patent specification No. 690 579 describes a trailer in which the wheels are mounted under a slider which is slidably displaceable beneath the bed of the trailer in the longitudinal direction thereof. The towbar of said trailer is hinged to the slider and a locking hook is provided to prevent rotation about said hinge unless rotation is desired. According to this document, reverse thrust from the towing vehicle serves to tip the bed plate of the trailer backwardly to a position in which it is completely vertical.

The main aim of the present invention is to provide considerable improvement to the trailer described in said document, thereby enabling the trailer to be used for other purposes.

A subsidiary aim is to provide a tipping system which is readily adapted to current manufacturing techniques and which can be applied to a trailer regardless of the suspension system and the breaking system that it may use.

SUMMARY OF THE INVENTION

The present invention provides a tipper trailer comprising:
 a bed plate;
 a wheel-supporting frame including two wheels defining a horizontal transverse wheel axis, said frame being hinged to the rear end of said bed plate about a first hinge axis parallel to said wheel axis;
 a longitudinally directed slide disposed under said bed plate and receiving a sliding hinge capable of sliding longitudinally therein;
 a tow bar having a front end suitable for coupling to a towing vehicle, and having a rear end coupled to said sliding hinge about a second hinge axis parallel to said wheel axis;
 releasable locking means for locking said tow bar to said bed plate to prevent said tow bar from rotating relative thereto; and
 at least one connecting rod having a first end coupled to said sliding hinge about said second hinge axis and having a second end coupled to said wheel-supporting frame about a third hinge axis parallel to said wheel axis.

In one embodiment the wheel-carrying frame includes a common axle passing through the wheels, and said third hinge axis is distinct from said axle.

In another embodiment the axle passing through the wheels and the said hinge axis about which the connecting rod is hinged to the chassis members are aligned such that said axle occupies said hinge axis.

When the wheels are independent wheels with separate stub axles, the axis about which the connecting rod is hinged to the frame extends across said frame away from the geometrical axis passing through the wheel centers.

Preferably, the frame is provided with rear blocks in the vicinity of the hinge axis with the bed plate, said rear blocks being intended to rest on the ground when the bed plate is tilted into a substantially vertical position.

Additionally, the sliding stroke of the sliding hinge axis is such that it includes a point where the bed plate is lifted into a substantially horizontal position above the ground by the wheels located at the rear thereof, and the front of the bed plate is provided with at least one removable or collapsible leg intended to support said front portion of the bed plate.

BRIEF DESCRIPTION OF THE DRAWINGS

An embodiment of the invention is described by way of example with reference to the accompanying drawings, in which FIG. 1 is a diagrammatic elevation view of a trailer in accordance with the invention during tipping; and FIGS. 2 to 6 are more representational elevation views of a trailer in accordance with the invention occupying various different successive positions obtained by reverse thrust from the towing vehicle.

MORE DETAILED DESCRIPTION

Figure 3:
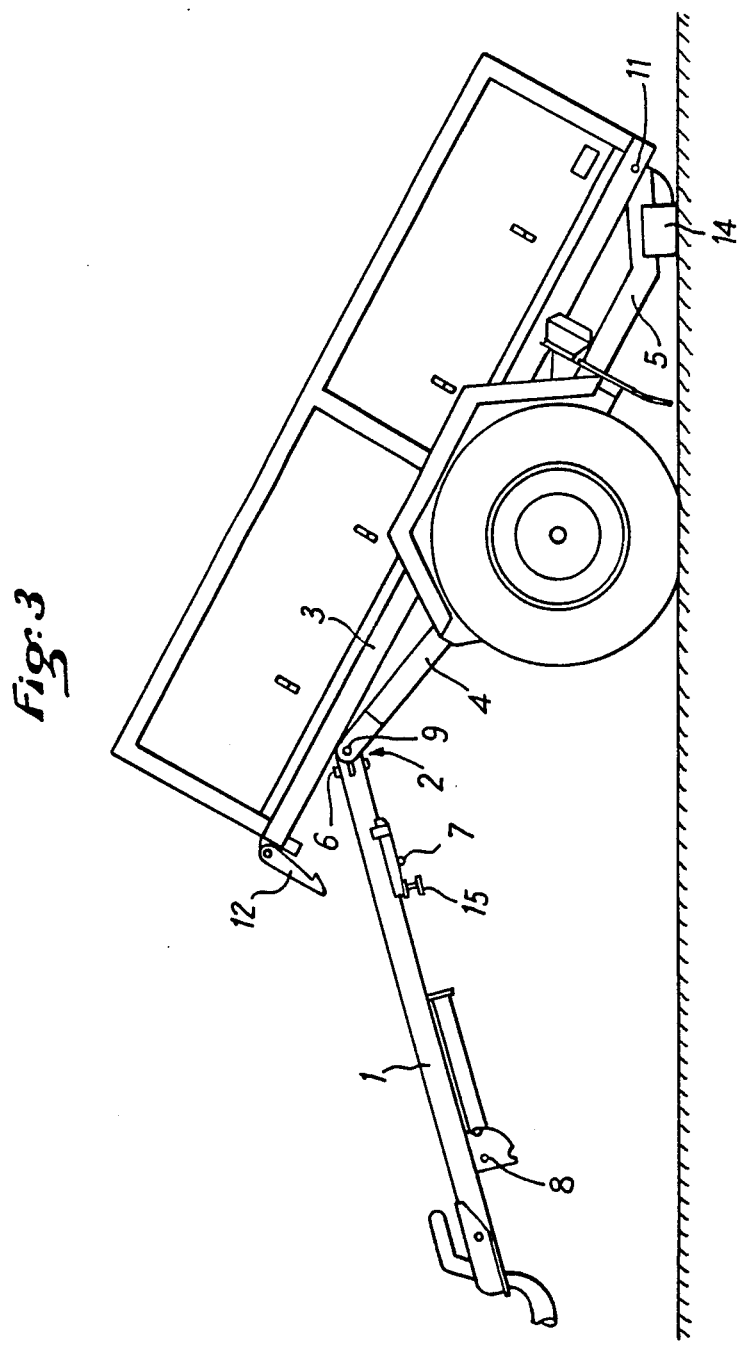

In the preferred embodiment shown, the tilting means comprise five main members which are initially described with reference to the diagrammatic view shown in FIG. 1.

The trailer has a towbar 1 which is strong enough to withstand the towing forces required for towing the trailer and also to withstand the thrust forces for tipping the trailer. The front end of the towbar has a standard fastening (e.g. of the ball and socket type, together with an optional inertia brake), and the rear end of the towbar has a coupling with a vertical axis 6 which is fixed to a sliding hinge 2. There are at least two fixing points 7 and 8 disposed along the length of the towbar for fixing to the bed plate 3 of the trailer body. One of these points serves for locking the trailer in the running position and the other serves for locking the trailer in its table position. The towbar is also used for conveying an electric cable to operate the brake and indicator lights and a cable or pipe for operating the brakes. Finally, the towbar may be fitted with a short prop leg.

The sliding hinge 2 interconnects three members: the towbar 1, the bed plate 3, and at least one connecting rod 4. The sliding hinge 2 is coupled to the towbar about a vertical hinge axis 6, and it is coupled to the connecting rod 4 about a horizontal axis 9 which is parallel to the wheel axle(s). The hinge 2 slides under the bed plate in a matching guide 10. The guide 10 and the corresponding fittings on the sliding hinge 2 may be made in various ways, e.g. a slideway, a guide rail with co-operating wheels, etc.

The body of the tipper truck is of conventional structure and comprises a bed 3 with removable side walls. It is connected via a rear hinge 11 to a wheel-supporting frame 5 on which two wheels are mounted, and it is fixed to the guide 10 for the sliding hinge 2. The front of the bed 3 is fitted with means 12 for latching to the towbar 1, at least at the points 7 and 8 thereon. Finally, the bed 3 is also fitted with one or more removable or retractable legs for use as a table. A spare wheel for the trailer should also be fitted to the bed in conventional manner.

The connecting rod 4 is hinged at its ends about respective axes 9 and 13 which are parallel to the axle(s) of the trailer. The connecting rod serves to connect the sliding hinge 2 to the members of the wheel-carrying frame 5.

The frame 5 is hinged to the rear of the bed 3 at hinge 11, and has the wheels of the trailer mounted thereon. Shock absorber means may be provided between the wheels and the hinged frame 5. The frame 5 is hinged to the connecting rod 4 at 13. The rear of the frame 5 includes rear blocks 14 which are intended to come into contact with the ground. The frame 5 also supports, in conventional manner, mudguards, brake lights, indicator lights, and housings for receiving a jack during wheel changing.

The position shown in FIG. 1 is identical to the position shown in FIG. 4, as described below, and serves to show the slide 10 which is not visible in the other figures. FIG. 1 also serves to show details of the hinges which are not clearly visible in the other figures.

FIG. 2 shows the entirely conventional appearance of the trailer in its running position. The tipping means which are located underneath the bed plate 3 do not spoil its appearance. The sliding hinge 2 is forwardly located in the guide 10, and the towbar 1 is locked at point 7 to the latch 12. Adjusting means 15 serve to take up any slack which there may be in the latch. Similarly, the sliding hinge 2 includes an excentric system based on rotation of the towbar 1 about the axis 9 to prevent any unwanted play while the trailer is being used in the running position.

FIG. 3 shows the end of a first tipping stage, i.e. the towbar 1 has been unlatched from the tipper body by raising the latch 12. In this position the load is largely supported by the two wheels, and also by the two rear blocks 14 situated in the lower rear corners of the frame 5 and now in contact with the ground. The sliding hinge 2 is still at the leading end of the guide 10.

Figure 4:
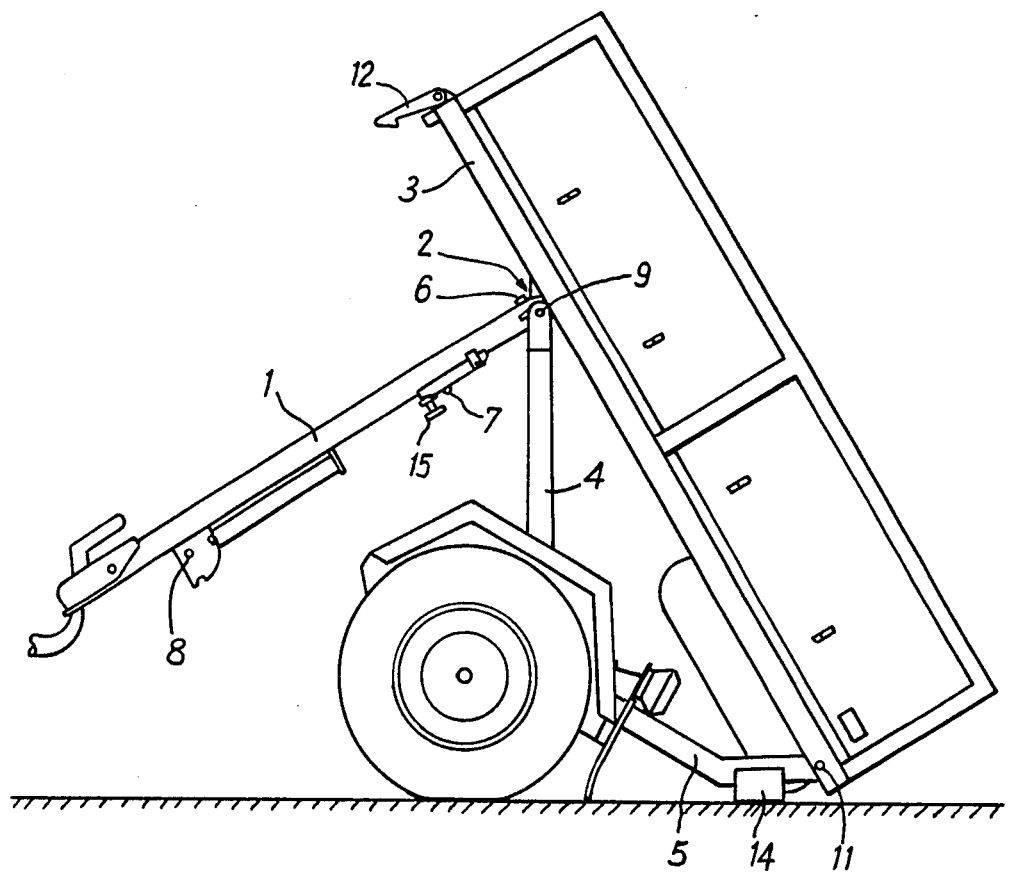

FIG. 4 shows the same trailer after the second operative phase is nearly over. The towing vehicle has performed the most difficult part of its backwards work. This figure shows one of the more important details of the tipping operation, namely the inclination of the towbar 1 which is shown in its maximally inclined position in FIG. 4 with the connecting rod 4 being in the vertical position and with the sliding hinge 2 moved part way rearwardly along the guide 10.

Figure 5:
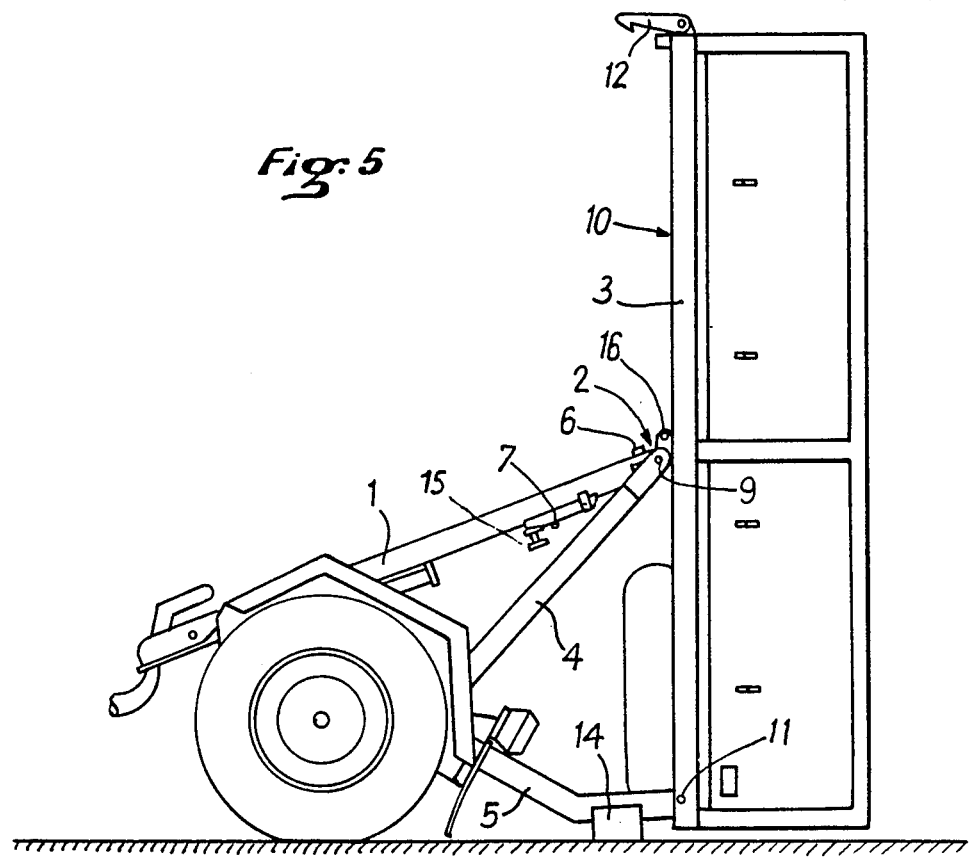

FIG. 5 shows the trailer at the end of the tipping operation, after further rearward movement of the towing vehicle. The bed plate 3 is now vertical and the excentric means 16 for locking the sliding hinge 2 can now be seen. The sliding hinge is at its rearmost position in the guide 10. The tipping operation is complete, and the trailer can be returned to its normal position of use by advancing the towing vehicle and relocking the towbar to the bed plate 3.

Figure 6:
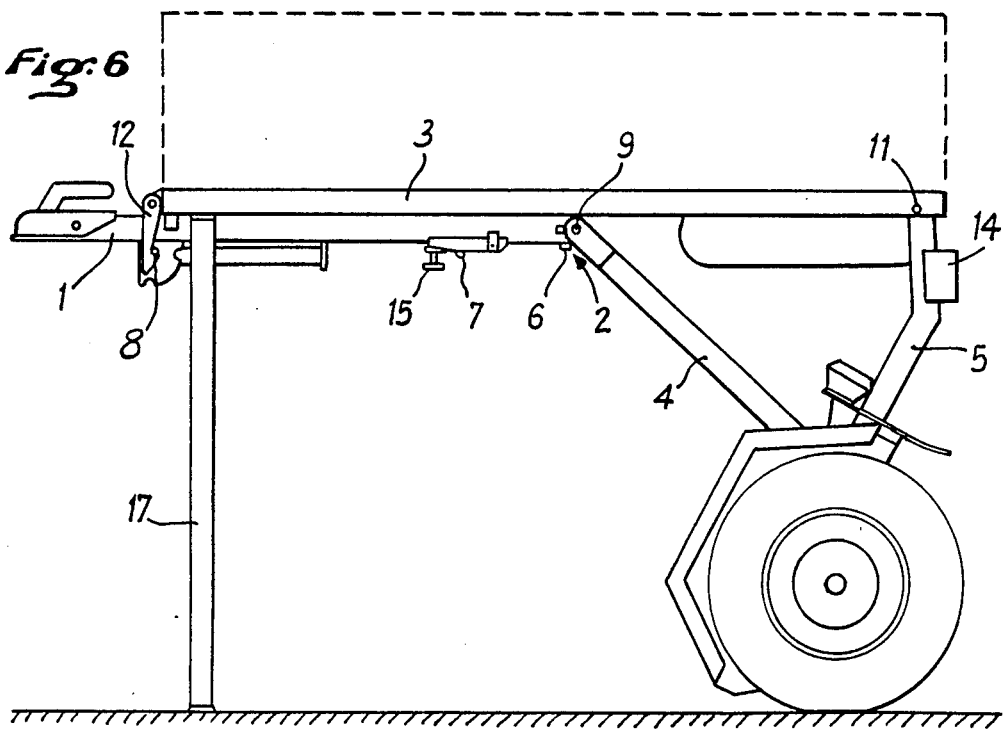

FIG. 6 shows the same trailer but in a different position which is directly obtainable from the position shown in FIG. 5. From the FIG. 5 position, the towbar 1 is raised to come into contact with the vertical bed plate 3 and the latch 12 locks onto the front latching point 8 on the towbar. One or more removable or retractable front legs 17 are then put into position and the entire assembly is pivoted about the wheels, thereby obtaining a most advantageous position in which the trailer may be used as a table, a workbench, scaffolding, etc.

Figure 7:
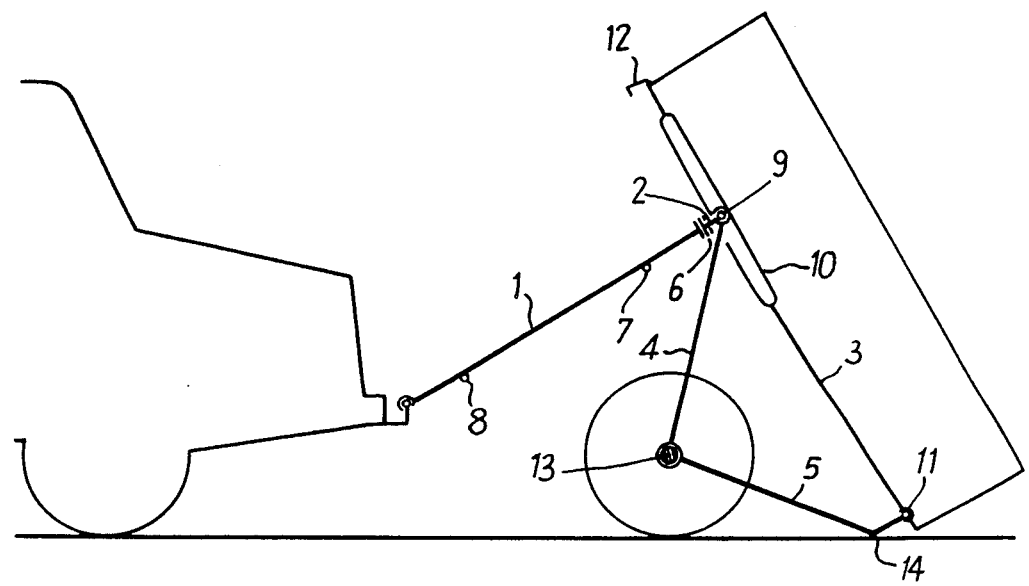
FIG. 7 is a diagrammatic elevation view of a trailer in accordance with the invention wherein a hinge axis is coincident with the wheel axis.

FIG. 7 shows the trailer in the same positions as illustrated in FIGS. 1 and 4, however, this figure depicts an embodiment of the trailer wherein the axis 13 is coincident with the wheel axis.

The operation of the trailer as described above comprises two main phases:

the first phase, after the end board has been removed, consists in unlatching the towbar 1 from the bed plate 3 at the latch 12 and in manually tilting the bed plate 3 until its rear end rests on the ground. In this position, the trailer and its load are supported by the wheels and also by the two rear blocks 14 located at the rear bottom corner of the frame members 5. These blocks which are fixed to the frame and come into contact with the ground make it unnecessary to brake the wheels.

The second phase makes use of thrust from the towing vehicle while moving backwards. Since the invention reduces the force required for tipping (compared with a convention hydraulic brute-force raising of the front end of the bed plate 3) there is no need to provide special reinforcement of the towing point on the vehicle which is not subjected to any stresses greater than those normally encountered in towing.

The vehicle may move backwardly until it makes contact with the wheels of the trailer, but there is no need to reverse beyond the point at which the bed plate 3 is in the vertical position. The advantage of tilting the bed plate 3 until it is completely vertical is not negligible, in that the vertical position is the best possible position for ensuring that none of the load remains in the trailer.

In the position shown in FIG. 6, the bed plate 3 is horizontal but at a higher level than its normal running position, and in this position it is suitable for performing functions other than those which were previously possible for a trailer, as described above.

I claim:

1. A tipper trailer comprising:
   a bed plate having a front and a rear;
   a wheel-supporting frame including two ground-engaging wheels defining a horizontal transverse wheel axis, said frame being hinged to said bed plate proximate the rear end of said bed plate about a first hinge axis parallel to said wheel axis;
   a longitudinally directed slide disposed under said bed plate and rigidly connected thereto slidingly receivable of a sliding hinge;
   a sliding hinge received within said longitudinally directed slide, said sliding hinge slideable between a forward position proximate said front of said bed plate and a rearward position remote from said front of said bed plate;
   a tow bar having a front end suitable for coupling to a towing vehicle, and having a rear end directly coupled to said sliding hinge about a second hinge axis parallel to said wheel axis, said tow bar being pivotable about said second hinge axis relative to said bed plate;
   releasable locking means for locking said tow bar to said bed plate to prevent said tow bar for rotating relative thereto; and at least one connecting rod having a first end pivotally coupled to said sliding hinge about said second hinge axis and having a second end pivotally coupled to said wheel-supporting frame about a third hinge axis parallel to said wheel axis.

2. A trailer according to claim 1, wherein said wheels are fixed to a common axle, wherein said third hinge axis is distinct from said common axle, and wherein said frame includes a transverse member running substantially along said third hinge axis.

3. A trailer according to claim 1, wherein said wheels are fixed to a common axle, and wherein said third hinge axis and said wheel axis are the same axis.

4. A trailer according to claim 2, wherein said wheels are fixed to independent stub axles, wherein said third hinge axis is distinct from said common axle, and wherein said frame includes a transverse member running substantially along said third hinge axis.

5. A trailer according to claim 1, wherein said wheel-supporting frame includes first and second frame members each hinged to the rear of said bed plate and each supporting one of said wheels, and wherein said sliding hinge is connected to each of said first and second frame members by corresponding first and second connecting rods.

6. A trailer according to claim 1, wherein said wheel-supporting frame includes rear blocks located between each wheel and said first hinge axis and intended to rest on the ground when said bed plate is tipped into a substantially vertical position.

7. A trailer according to claim 1, wherein said releasable locking means comprises a first latch member connected to said tow bar proximate said front end of said tow bar, a second latch member connected to said tow bar proximate said rear end of said tow bar, and a latch means, connected to said front of said bed plate, for releasably holding said first latch member or said second latch member; whereby when said second latch member is held by said latch means said sliding hinge is in said forward position and said bed plate is supported by said wheel-supporting frame at a normal running position above the ground with a predetermined distance between said bed plate and the ground, and when said first latch member is held by said latch means said sliding hinge is in said rearward position and said bed plate is supported by said wheel-supporting frame at a position above the ground with a distance between said bed plate and the ground greater than said predetermined distance; and said trailer further comprises a retractable leg means, connected to the front of said bed plate, for holding said bed plate horizontal when said latch means holds said first latch member.

8. A trailer according to claim 7, wherein said releasable locking means include manually adjustable tightening means for taking up slack while in the running position.

* * * * *